Oct. 26, 1926.  1,604,225
H. F. GEORGE
STEERING GEAR LOCK FOR AUTOMOBILES
Filed August 2, 1920    2 Sheets-Sheet 1
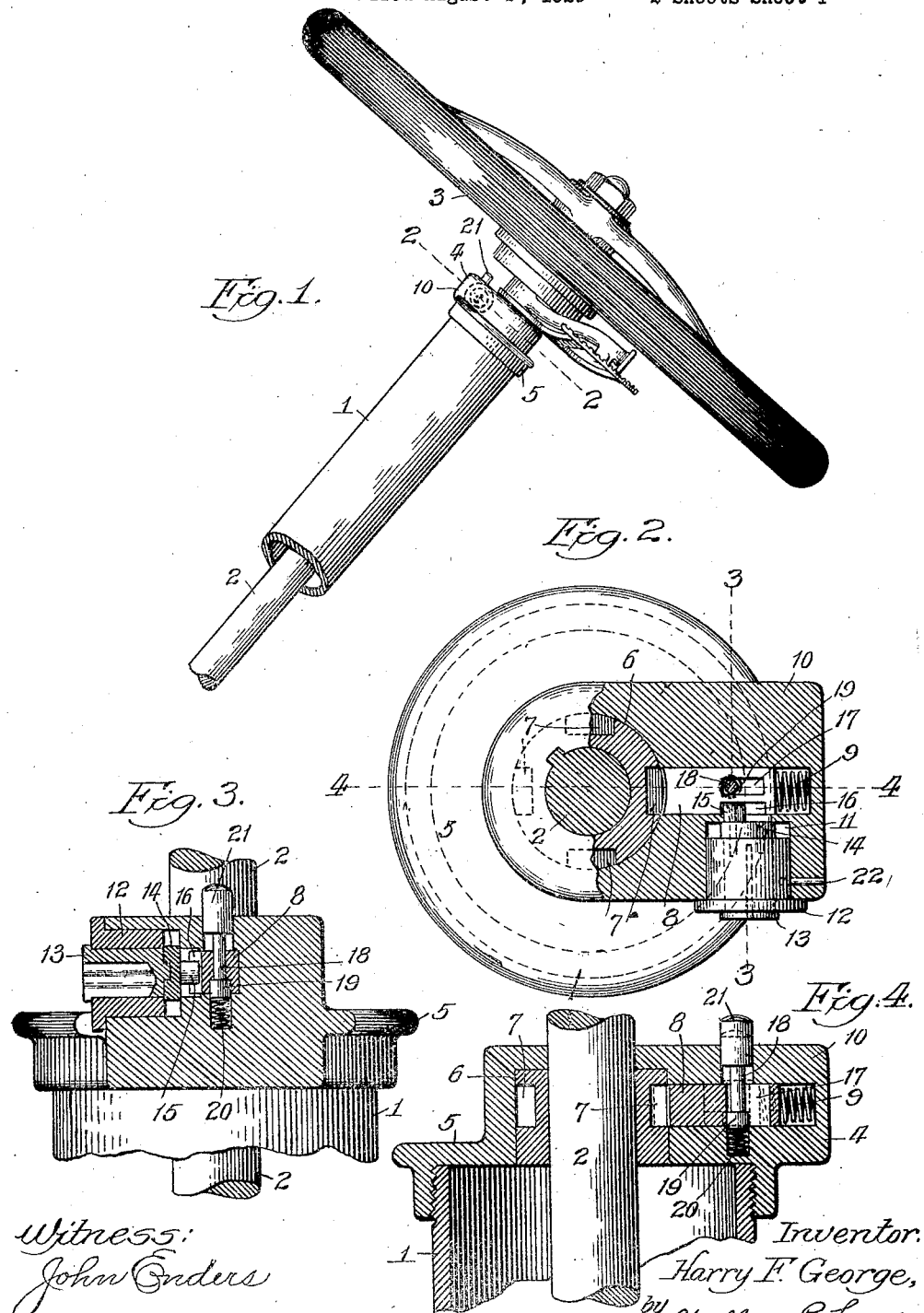
Witness:
John Enders
Inventor:
Harry F. George,
by Wallace R. Lane
Atty Oct. 26, 1926.
H. F. GEORGE
STEERING GEAR LOCK FOR AUTOMOBILES
Filed August 2, 1920     2 Sheets-Sheet 2
1,604,225
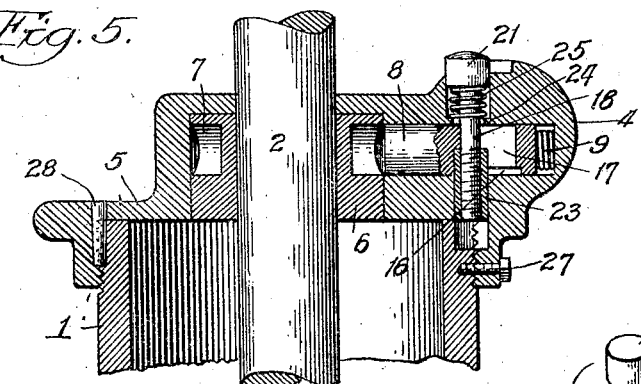
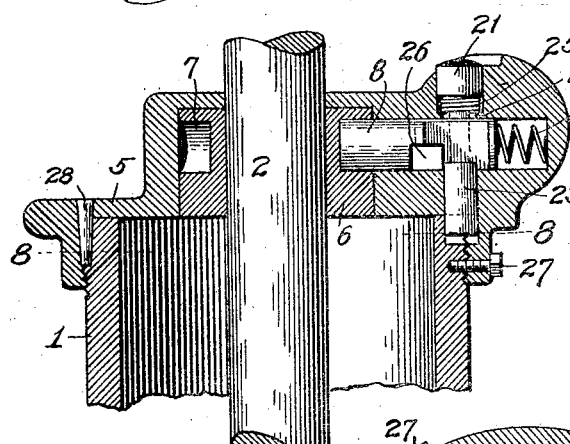
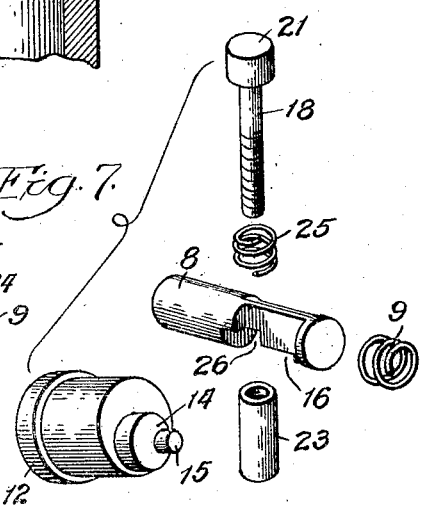
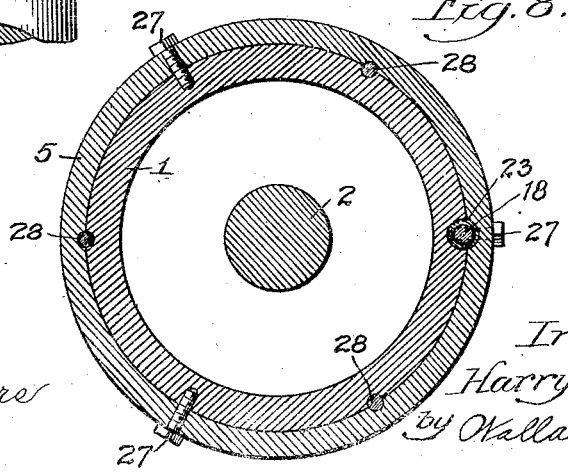
Witness:
John Enders
Inventor:
Harry F. George,
by Wallace R. Lane
Atty.

Patented Oct. 26, 1926.

1,604,225

UNITED STATES PATENT OFFICE.

HARRY F. GEORGE, OF CHICAGO, ILLINOIS, ASSIGNOR, BY MESNE ASSIGNMENTS, TO H-R MANUFACTURING COMPANY, OF CHICAGO, ILLINOIS, A CORPORATION OF ILLINOIS.

STEERING-GEAR LOCK FOR AUTOMOBILES.

Application filed August 2, 1920. Serial No. 400,612.

My invention relates to means for locking relatively moveable members in any desired or predetermined position, and is particularly adaptable for use in locking the steering gear or any other suitable part of a vehicle, particularly of an automobile. It is an object of my invention to provide means automatically operable upon the mere manual depression of a plunger, to lock two relatively moveable parts against such relative motion; and such further objects, advantages and capabilities as will later more fully appear.

My invention further resides in the combination, construction, and arrangement of parts illustrated in the accompanying drawings, and while I have shown therein preferred embodiments I desire the same to be understood as illustrative only and not as limiting my invention.

For an illustration of some of the forms and one of the applications of my invention reference is to be had to the accompanying drawings in which Fig. 1, is a fragmentary elevation of a steering post and wheel with the locking mechanism applied thereto; Fig. 2 is a fragmentary section substantially along the plane indicated by the line 2—2 Fig. 1; Fig. 3 is a fragmentary sectional elevation substantially along the plane indicated by the line 3—3 Fig. 2; Fig. 4 is a fragmentary section substantially along the plane indicated by the line 4—4 of Fig. 2; Figs. 5 and 6 show in longitudinal section a modification of the above structure; Fig. 7 shows an expanded perspective view of the locking mechanism of the modification; and Fig. 8 shows a cross section substantially along the plane indicated by the line 8—8 Fig. 6, showing different means to prevent relative rotation of the cap and steering column.

Referring more in detail to the drawings, numeral 1 denotes the steering post or column, 2 the steering shaft, 3 the steering wheel, and 4 my improved locking mechanism which is interposed around the shaft, between the steering post and wheel. The locking mechanism comprises a lock carrying cap 5 and a ring 6, which surround the shaft 2 and are respectively secured to the upper end of the steering post or column 1 and the shaft 2, the ring 6 resting within a pocket in the interior of the cap 5 as shown best in Fig. 4. The ring 6 is suitably secured to the shaft 2, as by a key or spline, and is provided on its exterior surface with depressions 7, adapted to receive the inner end of a plunger 8. This plunger is pressed inwardly by a resilient means 9 such as a coil spring, and, upon being moved, will rest against the outer surface of ring 6 until relative motion of the parts 5 and 6 brings the plunger 8 into registry with one of the pockets 7, whereupon said plunger becomes seated in the pocket and prevents relative rotation of these parts.

The cap 5 is provided at one side of its upper surface with an enlargement 10, having an internal socket for the reception of the plunger 8 and having a laterially directed socket 11, for the reception of the lock 12, carrying the lock cylinder 13, these parts 12 and 13 being of ordinary construction. Secured to the inner end of cylinder 13, in the examples shown, is a disc 14 carrying on its inner face a pin or plug 15, adapted to extend into a notch 16 in one face of the plunger 8. It will therefore be seen that when a proper key is inserted in the key slot of the cylinder 13 and the cylinder is rotated the pin 15 will cause plunger 8 to be retracted, placing a tension on spring 9. It is preferable that pin 15 be an antifriction roller rotatably secured to the face of the disk 14 by means of a screw or other similar fastening means, as shown. This reduces the friction incident to turning the lock cylinder and withdrawing the plunger 8.

In order to hold the plunger 8 in retracted position the same is provided with a slot 17 through which passes a pin 18 having a head 19, adapted to engage in a suitable enlargement at the lower end of the slot 17. It will be seen that inasmuch as this pin is pressed outwardly by means of a spring 20, it will immediately become seated in this socket or enlargement when the locking plunger 8 is withdrawn sufficiently by turning the key. It is also evident that when the key does not act to prevent the lock cylinder from rotating and pressure is exerted on the finger piece 21 of pin 18, to push the head 19 out of its socket in plunger 8 the plunger will be released to be forced inwardly by spring 9. It will therefore be seen that a mere manual depression of the finger piece 21, places the parts in position to automatically lock the steering mechanism, if, or so soon as, one of the sockets 7 is in alinement with the plunger 8. A pin 22 is shown as the means whereby the lock shell 12 is fastened in position within the socket 11.

In the modification shown in Figs. 5, 6, 7 and 8 an internally screw threaded sleeve 23 corresponds to head 19, but is longer so that it may extend down through the wall of cap 5 into a hole bored into the cap and also steering column, as shown more clearly in Fig. 6. Surrounding the aperture in the cap 5, through which pin or bolt 18 extends is a shoulder 24, against which rests the inner end of coil spring 25, whose outer end touches against the inner face of finger piece 21 to cause the same to be pushed outwardly. Since sleeve 23 is screwed on to pin 18, it is pulled outwardly because of the tension on spring 25. Therefore when a key is inserted in the lock and rotated to retract plunger 8, the sleeve will naturally be seated in the aperture 26 in said plunger, thereby locking the plunger in retracted position as shown in Fig. 5. Plunger 8 is provided with a slot 17, shown in Fig. 2 and described above. It will be seen from Figs. 5, 6 and 8 that when the finger piece 21 is pushed inwardly sleeve 23 leaves aperture 26, permitting plunger 8 to be seated in an aperture 7, and at the same time the lower end of said sleeve 23 is pushed into the hole between the cap 5 and the top of the steering column, thus locking ring 6 and the steering column together. This of course locks the shaft 2 to column 1. This operation is accomplished merely by pushing downwardly on the finger piece 21, no key whatever being necessary in this operation.

If desired, one or more bolts or screws 27 may be inserted through the flange of cap 5 into the top of the steering column or one or more tapered pins 28 may be driven into tapered holes extending down through the top of the cap into openings between the flange and top of the column as shown in Figs. 5, 6 and 8. If desired, both of these methods may be used to prevent the rotation of the cap on the top of the steering column. It will be understood that either, both, or neither of these methods of securing the cap to the column may be used in conjunction with the sleeve 23 on pin or bolt 18.

It is of course understood that the specific description of structure set forth above may be departed from without departing from the spirit of my invention as set forth in this specification and the appended claims.

Having described my invention, I claim:

1. In a locking mechanism, a fixed member, a rotatable member in the fixed member, a lock member on the rotatable member, a cap member secured to said fixed member, a locking plunger slidable in the cap member into locking position with the lock member, a spring operating to move the locking plunger into locking position, a release plunger reciprocably mounted in the cap, said plungers having inter-engageable projections whereby the release plunger normally holds the locking plunger in unlocked position, and is movable to disengage the projections whereby the locking plunger is automatically moved into locking position, said release plunger being adapted to also lockingly engage said fixed member.

2. In a locking mechanism, a fixed member, a rotatable member in said fixed member, locking mechanism connected to the fixed member, said mechanism comprising a spring pressed member movable to engage with and lock said rotatable member against rotation in the fixed member, means to move said movable member to unlocked position, and means for normally holding the movable member in unlocked position, and operable to permit said movable member to be moved into locked position, said last mentioned means being adapted to lockingly engage said fixed member when so operated.

3. In a locking mechanism, a fixed member having a locking means and a recess, a rotatable member in said fixed member, locking mechanism connected to the fixed member, said mechanism comprising a spring pressed member movable to engage with and lock said rotatable member against rotation in the fixed member, means to move said movable member to unlocked position, a movable element normally holding the movable member, and to engage said recess in the fixed member.

4. In a locking mechanism, a fixed member having a locking recess, a rotatable member in said fixed member, locking mechanism connected to the fixed member, said member comprising a spring pressed member to engage with and lock said rotatable member against rotation in the fixed member, means to move said movable member to unlocked position, a spring pressed element movable in the path of the movable member and in one position holding the movable member in unlocked position and in another position releasing the movable member for automatically locking the rotatable and fixed members together, said spring pressed element being adapted to lockingly engage said recess in the fixed member.

5. In a locking mechanism, a fixed member, a rotatable member within said fixed member, a locking cap on said fixed member, a ring mounted on said rotatable member, said ring having depressions therein, a bolt slidably mounted in said cap, a spring projecting said bolt inwardly toward said depression, a key barrel housed in said cap and extending at right angles to said locking bolt, said key barrel having a key-controlled detent adapted to engage said sliding bolt to slide the same rearwardly away from said ring, a plunger housed in said cap and projecting through the upper face thereof, a spring normally forcing said plunger to project upwardly of said locking cap, said plunger and said bolt having inter-engaging portions to hold said plunger in retracted position.

6. A mechanism for locking a rotatable element to a fixed member comprising a ring secured to said element and having a recess therein, a housing secured to said member, a spring, a spring actuated plunger engageable with said recess, a lock adapted to retract said plunger from said recess, and a bolt normally adapted to hold said plunger retracted, said bolt being adapted to release said plunger from its retracted position and to lock said housing on said member when said plunger is in locking position.

In witness whereof, I hereunto subscribe my name to this specification.

HARRY F. GEORGE.